(12) United States Patent
Gallegos-Lopez et al.

(10) Patent No.: US 7,759,886 B2
(45) Date of Patent: Jul. 20, 2010

(54) LINEARITY FOR FIELD WEAKENING IN AN INTERIOR PERMANENT MAGNET MACHINE

(75) Inventors: Gabriel Gallegos-Lopez, Torrance, CA (US); Yo Chan Son, Torrance, CA (US); Milun Perisic, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 328 days.

(21) Appl. No.: 11/829,298

(22) Filed: Jul. 27, 2007

(65) Prior Publication Data

US 2009/0027000 A1    Jan. 29, 2009

(51) Int. Cl.
*H03K 5/00* (2006.01)
(52) U.S. Cl. ............ 318/400.2; 318/400.1; 318/722
(58) Field of Classification Search .............. 318/400.2, 318/400.1, 722
See application file for complete search history.

(56) References Cited

U.S. PATENT DOCUMENTS

| 4,677,360 | A  | * | 6/1987 | Garces ...................... 318/803 |
| 5,883,484 | A  | * | 3/1999 | Akao .......................... 318/700 |
| 6,208,108 | B1 | * | 3/2001 | Nashiki et al. ............... 318/701 |
| 6,288,515 | B1 | * | 9/2001 | Hiti et al. .................... 318/722 |
| 6,605,912 | B1 | * | 8/2003 | Bharadwaj et al. ...... 318/400.09 |
| 7,015,667 | B2 | * | 3/2006 | Patel et al. .................. 318/432 |
| 7,023,168 | B1 | * | 4/2006 | Patel et al. .................. 318/757 |
| 7,174,989 | B2 | * | 2/2007 | Mori et al. .................. 180/446 |
| 7,242,163 | B2 | * | 7/2007 | Gallegos-Lopez et al. .. 318/812 |

* cited by examiner

*Primary Examiner*—Bentsu Ro
*Assistant Examiner*—David S Luo
(74) *Attorney, Agent, or Firm*—Ingrassia Fisher & Lorenz, P.C.

(57) ABSTRACT

Systems and methods are disclosed to provide torque linearity in the field-weakening region for an IPM machine. The systems and methods adjust the q-axis and the d-axis components of the stator current commands of the IPM machine using a flux weakening and a torque linearity control loop respectively. Thereby, torque linearity is maintained during the field weakening region of operation of the IPM machine.

19 Claims, 5 Drawing Sheets

FIG. 1
(EXISTING ART)

LINEARITY FOR FIELD WEAKENING IN AN INTERIOR PERMANENT MAGNET MACHINE

TECHNICAL FIELD

Embodiments of the present invention relate generally to electric machine control, and more particularly relate to techniques that affect torque linearity in a field weakening region of an electric machine.

BACKGROUND

An electric machine converts electrical power into mechanical force and motion. Electric machines are found in numerous applications including household appliances such as fans, refrigerators, and washing machines. Electric drives are also increasingly used in electric and hybrid-electric vehicles.

A rotary electric machine generally has an internal rotating magnet, called the rotor, which revolves inside a stationary stator. The interaction between the rotor electromagnetic field with the field created by the stator winding creates the machine torque. The rotor may be a permanent magnet or it may be made of coils. However, if the rotor has permanent magnets embedded therein (i.e., the permanent magnets are not in the rotor surface), the electric machine may be referred to as an interior permanent magnet (IPM) machine. The part of the machine across which the input voltage is supplied is called the "armature". Depending upon the design of the machine, either the rotor or the stator can serve as the armature. In an IPM machine, the armature is the stator, and is a set of winding coils powered by input voltage to drive the electric machine.

The reverse task of converting mechanical energy into electrical energy is accomplished by a generator or dynamo. An electrical machine as mentioned above may also function as a generator since the components are the same. When the machine/generator is driven by mechanical torque, electricity is output. Traction machines used on hybrid and electric vehicles or locomotives often perform both tasks.

Typically as an electric machine accelerates, the armature (and hence field) current reduces in order to keep stator voltage within its limits. The reduction in field which reduces magnetic flux inside the machine is also called flux or field weakening. Field weakening control techniques can be used to increase performance in the torque-speed characteristic of the machine. To retain control of stator current, the machine field may be reduced by a field weakening control loop. The field or flux weakening in an IPM machine can be accomplished by adjusting the stator excitation. Stator excitation in an IPM machine may be controlled by voltage pulse width modulation (PWM) of a voltage source inverter.

Flux weakening techniques have been used in the past where IPM flux is purposely made weak to reduce the problems associated with high flux, such as over voltage due to high Back-EMF. For example, during a constant torque region of operation of an electric machine, closed loop current regulator control has been used to control the applied PWM voltage excitation so that the instantaneous phase currents follow their commanded values. However, saturation of the current regulators may occur at higher speeds when the machine terminal voltage approaches the maximum voltage of the PWM inverter. Beyond this point, the flux should be weakened to maintain proper current regulation up to the maximum available machine speed. Reducing the magnetic flux inside the machine provides improved power characteristics of the IPM machine at high speeds. However, torque may decrease in direct proportion to the flux.

Accordingly, it is desirable to keep torque linearity in the field-weakening region for an IPM machine within the voltage and current system constraints. Furthermore, other desirable features and characteristics will become apparent from the subsequent detailed description and the appended claims, taken in conjunction with the accompanying drawings and the foregoing technical field and background.

BRIEF SUMMARY

Systems and methods are disclosed for producing torque linearity in the field-weakening region of an IPM machine. The systems and methods adjust the q-axis and the d-axis components of the stator current commands of the IPM machine using a flux weakening and a torque linearity control loop, respectively. Thereby, torque linearity is maintained during the field weakening region of operation of the IPM machine.

A system according to a first embodiment comprises the following elements. A table look-up module is used to receive a torque command, a rotor angular velocity, and a DC-link voltage as inputs, and to output q-axis and d-axis current commands. A synchronous current regulator module with dynamic over modulation is also used to generate q-axis and d-axis voltage commands based on the current commands. To compensate for differences between the q-axis commanded current and the q-axis available current, a field weakening module is employed to generate an adjustment for the q-axis current command based on the voltage commands. An adder is used to adjust the q-axis current command by adding the q-axis current adjustment to the q-axis current command. Additionally, to maintain torque linearity, a torque linearity module generates a d-axis current adjustment as a function of the q-axis current adjustment. A second adder is used to adjust the d-axis current command by adding the d-axis current adjustment to the d-axis current command.

An embodiment of a method described herein begins by generating q-axis and d-axis current commands based on a torque command, a rotor angular velocity, and a DC-link voltage. The method then generates q-axis and d-axis voltage commands based on the current commands. To compensate for differences between the q-axis commanded current and the q-axis available current, the method generates an adjustment to the q-axis current command based on the voltage commands. To adjust the q-axis current command, the method then adds the q-axis current adjustment to the q-axis current command. Additionally, to maintain torque linearity, the method generates a d-axis current adjustment as a function of the q-axis current adjustment. To adjust the d-axis current command, the method then adds the d-axis current adjustment to the d-axis current command.

A second system according to another embodiment includes a torque linearity control architecture for an electric machine comprising the following elements. A proportional gain module generates a proportional gain, and multiplies the proportional gain by the q-axis current adjustment to obtain the d-axis adjustment current. A limiter module maintains the d-axis current adjustment within a maximum range.

BRIEF DESCRIPTION OF THE DRAWINGS

Embodiments of the present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, controlled switches, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of vehicle applications and that the system described herein is merely one example embodiment of the invention.

For the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 2:
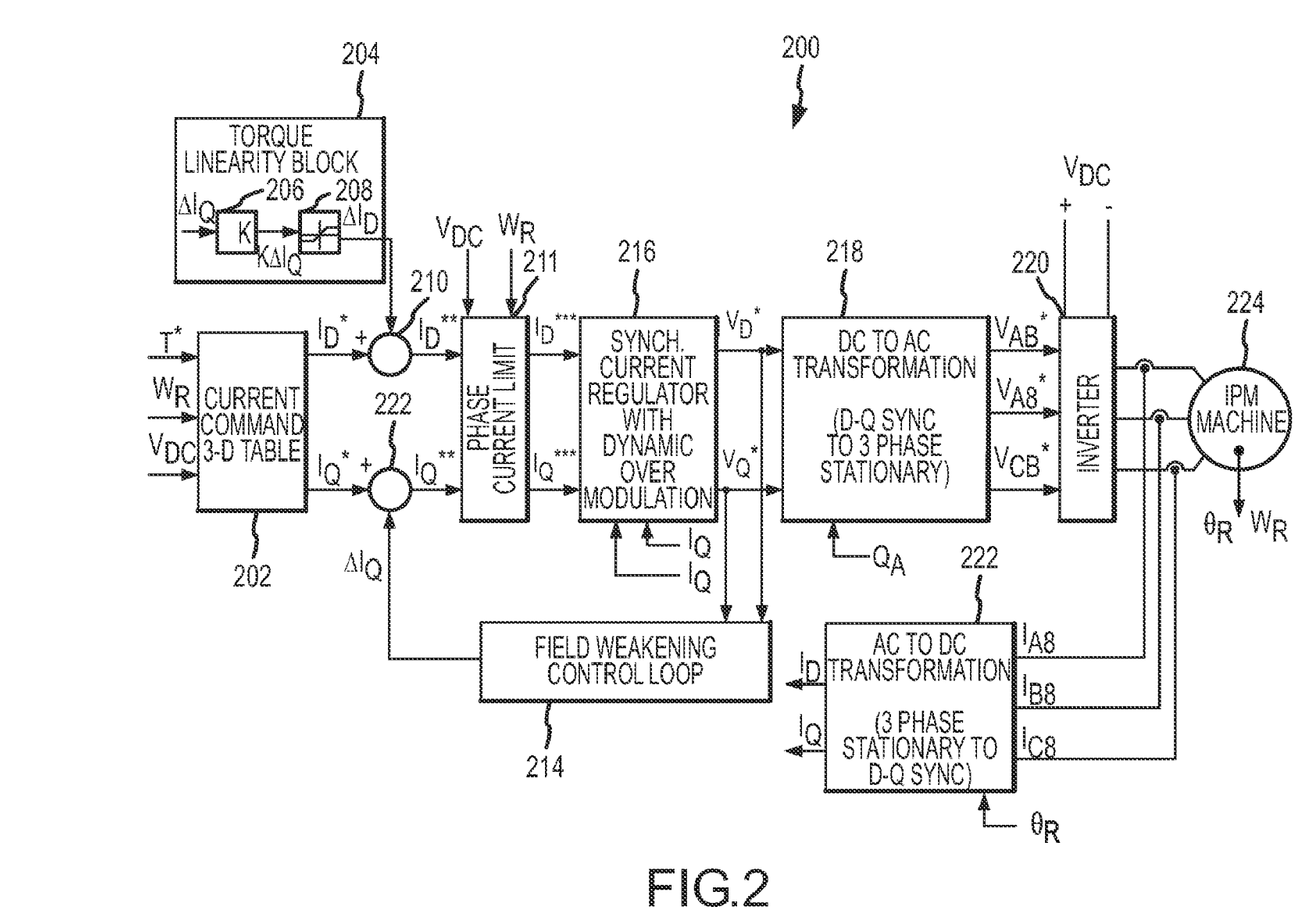
FIG. 2 is a functional block diagram of a control system with a torque linearity control block for a vector controlled IPM machine.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 2 depicts an example arrangement of elements, additional intervening elements, devices, features, or components may be present in an embodiment of the invention (assuming that the functionality of the system is not adversely affected).

Embodiments of the invention are described herein in the context of one practical non-limiting application, namely, a control system for an IPM machine. In this context, the example technique is applicable to operation of a system suitable for a hybrid vehicle. Embodiments of the invention, however, are not limited to such vehicle applications, and the techniques described herein may also be utilized in other electric powered control applications.

Figure 1:
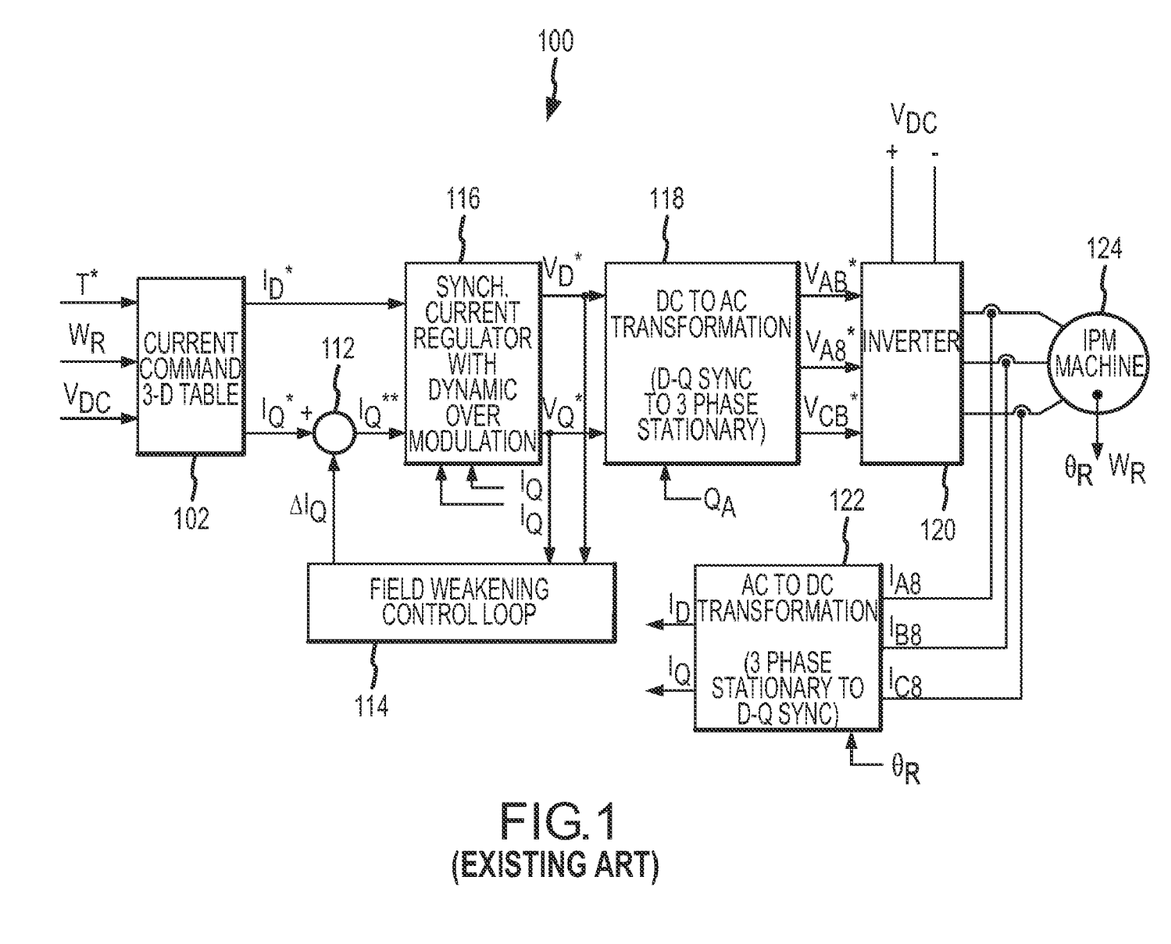
FIG. 1 is a functional block diagram that includes an existing control system without a torque linearity block for a vector controlled IPM machine.

FIG. 1 is a functional block diagram that depicts an existing control system 100 for a vector controlled IPM machine suitable for use with a hybrid vehicle. Such systems are well known and, therefore, the operation of system 100 will not be described in detail here. In summary, control system 100 adjusts the q-axis component of the stator current command $I_Q^*$ (q-axis current command) of the IPM machine using a flux weakening control loop. Control system 100 includes: a current command 3-D table lookup module 102, a synchronous current regulator module with dynamic over modulation 116, a DC to AC transformation module 118, a PWM inverter 120, an AC to DC transformation module 122, an IPM machine 124, and a field weakening module 114. Control system 100 operates as described below.

Based on a torque command T*, the rotor rotational speed $\omega_R$, and a DC-link voltage $V_{DC}$, optimal current commands ($I_D^*$ and $I_Q^*$) are generated using the current command 3-D table look-up module 102. The inputs to the table look-up module 102 are provided by a voltage sensor from the $V_{DC}$ input to the inverter 120, and a position sensor (not shown in FIG. 1) from the IPM machine 124. The q-axis current command $I_Q^*$ is adjusted to obtain an adjusted command ($I_Q^{**}$) as explained below.

The $I_D$ and $I_Q$ stationary currents (d-axis and q-axis components of the stator current) from the IPM machine 124 are fed to the synchronous current regulator module with dynamic over modulation 116, which generates synchronous voltage commands ($V_D^*$ and $V_Q^*$). The command voltages $V_D^*$ and $V_Q^*$ are vector rotated using the rotor angular position $\theta_R$, which is provided by IPM machine 124. The outputs of the current regulator with dynamic over modulation 116 (namely, $V_D^*$ and $V_Q^*$) are fed to the DC to AC transformation module 118 to generate stationary frame voltage commands ($V_{AS}^*$, $V_{BS}^*$, and $V_{CS}^*$) based on $V_D^*$ and $V_Q^*$.

The $V_{AS}^*$, $V_{BS}^*$, and $V_{CS}^*$ stationary frame voltage commands are fed to the inverter 120 to generate $I_{AS}$, $I_{BS}$ and $I_{CS}$, which are the respective stationary frame currents. The inverter 120 may be, for example, a PWM inverter which applies alternating three phase voltage to the stator winding of the IPM machine 124.

The IPM machine 124 then operates at the rotational speed $\omega_R$ based on the stationary frame currents $I_{AS}$, $I_{BS}$ and $I_{CS}$.

The AC to DC transformation module 122 generates $I_D$ and $I_Q$ (the d-axis and q-axis components of the stator feedback current) based on $I_{AS}$, $I_{BS}$, $I_{CS}$ and $\theta_R$. Additional details of the control system 100 can be found in United States Patent Application No. 2005/0212471, the content of which is hereby incorporated by reference in its entirety.

The Back-EMF is proportional to the rotational speed, $\omega_R$. Moreover, the Back-EMF of the electric machine increases as the rotational speed $\omega_R$ of the electric machine is increased. Above a certain rotational speed, the voltage of the IPM machine may become higher than the voltage of the bus, resulting in reversal of current flow (regenerating instead of motoring). To control the $I_D$ and $I_Q$ components of the stator current, the machine flux is reduced by a field weakening control loop. The field weakening module 114 generates an adjusting current command $\Delta I_Q$ ($\Delta I_Q$ is the adjusting q-axis current, (which decreases the flux in the machine but also decreases the torque), based on $V_D^*$ and $V_Q^*$ to adjust the current command $I_Q^*$. $\Delta I_Q$ is then added to $I_Q^*$ by an adder 112 to generate the adjusted current command $I_Q^{**}$.

Figure 3:
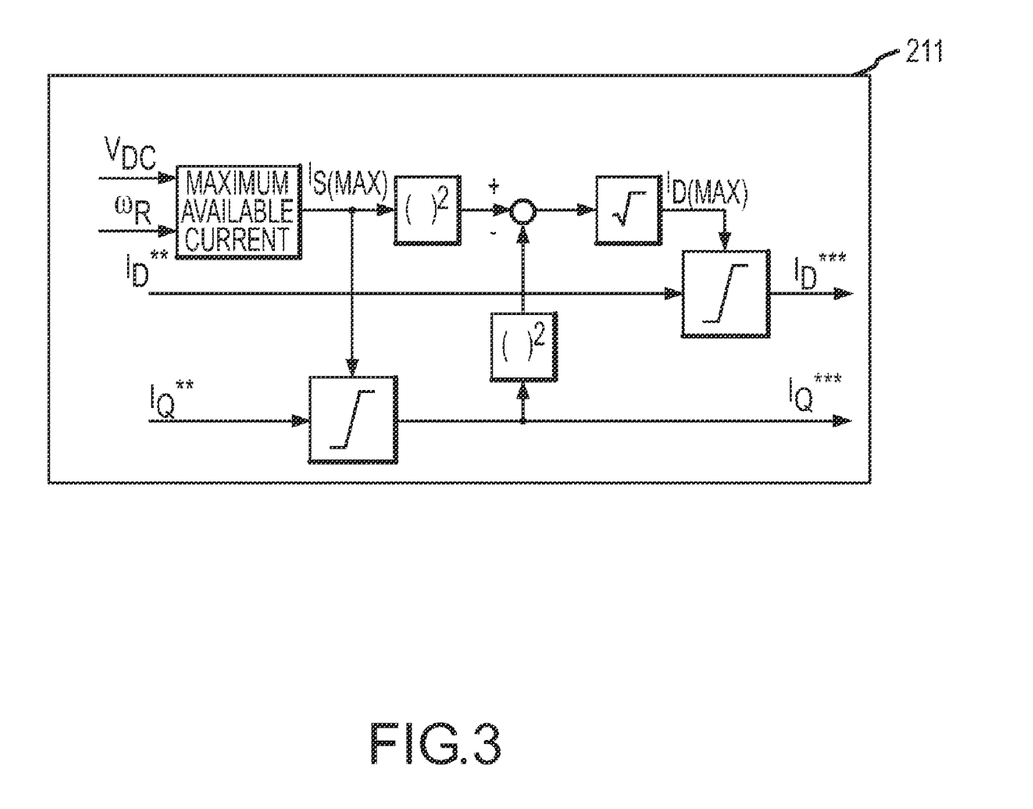
FIG. 3 is a functional block diagram of a phase current limit module of the control system of FIG. 2.

Adjusting $I_Q^*$ in this manner results in a decrease in the torque, as will be explained in the context of FIG. 3. The aforementioned reduction in torque reduces the maximum torque available from the IPM machine, and it may reduce the machine efficiency. Additional details of the field weakening control loop module 114 can be found in U.S. patent application Ser. No. 11/552,580, filed Oct. 25, 2006, which is hereby incorporated by reference in its entirety.

To keep torque linearity in the field weakening region of an IPM machine, a torque linearity loop according to an embodiment of the invention is utilized as explained below.

FIG. 2 is a block diagram that illustrates a control system 200 for a vector controlled IPM machine, which is suitable for use in a hybrid vehicle. System 200 includes a torque linearity control loop that is suitably configured to perform a torque linearity control function according to an embodiment of the invention. System 200 is suitable for use with a vehicle having an electric traction machine (e.g., an electric vehicle or a hybrid vehicle). A practical control system 200 may include a number of electrical components, circuits and controller units other than those shown in FIG. 2. Conventional subsystems, features, and aspects of the control system 200 will not be described in detail herein. The control system 200 has components that are similar to control system 100 (common features, functions, and elements will not be redundantly described here). For this embodiment, as shown in FIG. 2, the control system 200 generally includes: a current command 3-D table lookup module 202, a torque linearity module 204, a phase current limit module 211, a synchronous current regulator module with dynamic over modulation 216, a DC to AC transformation module 218, a PWM inverter 220, an AC to DC transformation module 222, an IPM machine 224, and a field weakening control loop module 214. System 200 operates with an IPM machine 224. In particular, inverter 220 drives IPM machine 224.

The torque linearity module 204 generates an adjusting current command $\Delta I_D$ ($\Delta I_D$ is the adjusting current in the d-axis, which decreases the flux in the machine while torque linearity is maintained), which is based on $\Delta I_Q$ as explained below. In practice, $\Delta I_Q$ is provided by the field weakening control loop module 214. $\Delta I_D$ is added by an adder 210 to $I_D^*$ to generate an adjusted current command $I_D^{}$. The adjusted current command $I_D^{}$ is fed to the synchronous current regulator module with dynamic over modulation 216.

For this embodiment, the torque linearity module 204 includes a proportional gain module 206 and a limiter module 208 coupled to the proportional gain module 206. The proportional gain module 206 applies a proportional gain, K, to $\Delta I_Q$. K may be a constant having a value that typically ranges from about one to about three, or it may be a variable that varies as a function of the torque command (T*) and the adjusted current command ($I_Q^{***}$). For example, K may be calculated based on the following relationship:

$$\frac{4}{3*P} \cdot \frac{T^*}{(L_Q - L_D)I_Q^{***2}},$$

where P is the number of poles of the machine, $L_D$ and $L_Q$ are the d-axis and q-axis machine inductances, T* is the torque command, and $I_Q^{***}$ is a limited q-axis current command.

$\Delta I_Q$ is multiplied by K to obtain an output current adjusting command ($\Delta I_D$). $\Delta I_D$ is then fed to the limiter 208 to keep the current adjusting command $\Delta I_D$ within its range (about −30 to about 0 AMPS).

To keep the $I_D$-$I_Q$ vector within the maximum torque per flux boundaries, the phase current limit module 211 is used.

The phase current limit module 211 is configured to set the maximum phase current at any DC-voltage $V_{DC}$ and machine rotor speed $\omega_R$. FIG. 3 is a functional block diagram that depicts the phase current limit module 211 (see FIG. 2). The maximum available current block 230 provides the maximum phase current $I_{S(max)}$ as a function of $V_{DC}$ and $\omega_R$. The maximum phase current $I_{S(max)}$ is constant in the constant torque region. However, in the field weakening region, $I_{S(max)}$ is decreased accordingly to follow the maximum torque per flux machine curve. $I_Q^{}$ is first limited by $I_{S(max)}$ resulting in the limited q-axis current command $I_Q^{*}$. The maximum d-axis current command is calculated as $I_{D(max)} = \sqrt{I_{S(max)}^2 - I_Q^{*2}}$. Then, $I_D^{}$ is limited by $I_{D(max)}$ resulting in the limited d-axis current command $I_D^{***}$.

Figure 4:
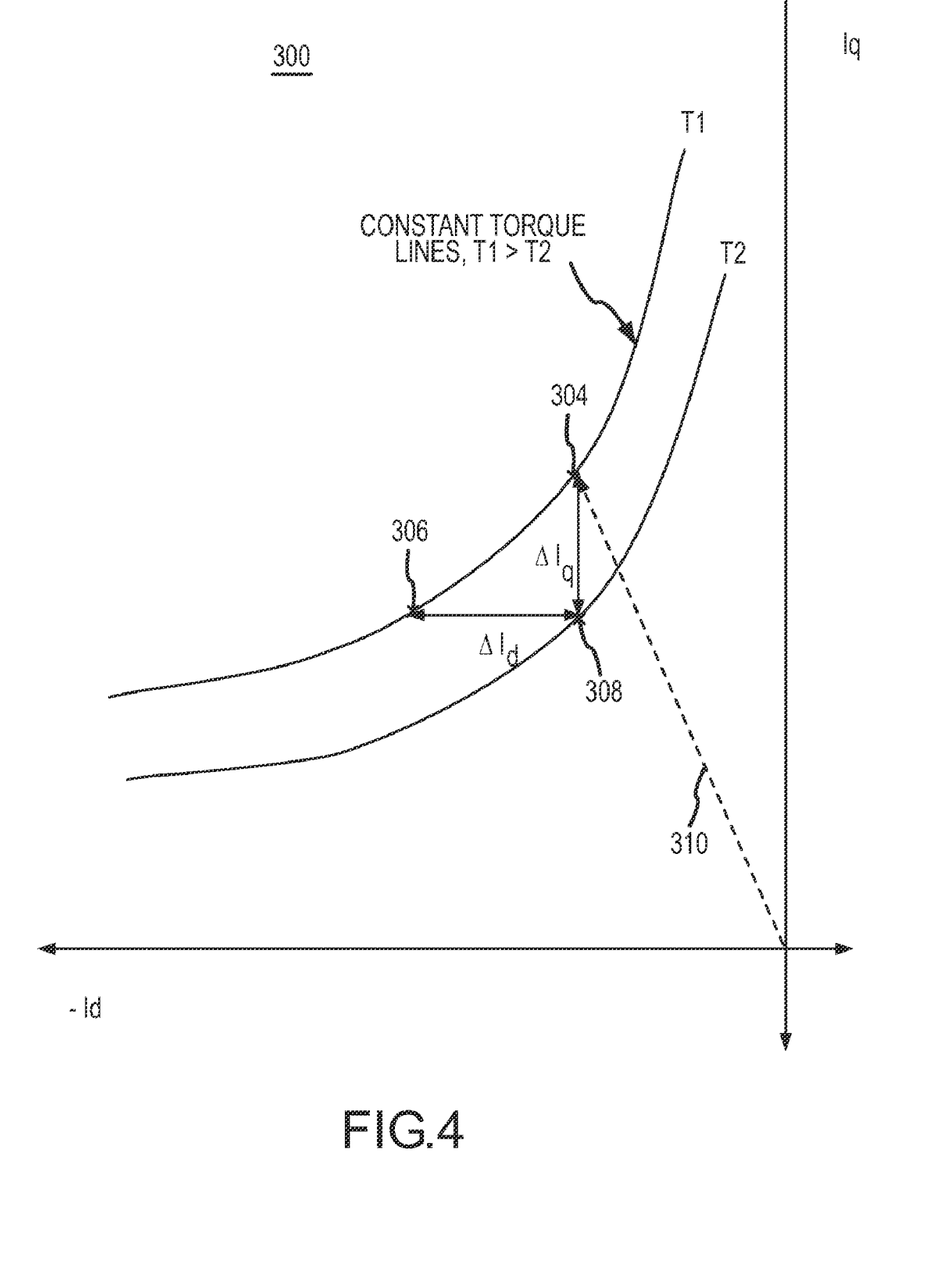
FIG. 4 illustrates current regulation performance for an IPM machine with and without the torque linearity control block.

FIG. 4 illustrates current regulation performance with and without the torque linearity control block. The field weakening control loop module 214 keeps the current regulator stable at the available voltage by adjusting the $I_Q$ current by an amount $\Delta I_Q$ as explained above. $\Delta I_Q$, however, moves the current vector 310 from point 304 on the T1 constant torque curve to point 308 on the T2 constant torque curve, thereby decreasing the torque in direct proportion to the flux. It is desirable to keep the current vector on the T1 constant torque curve in the field weakening region of the IPM machine. To this end, the control loop of the torque linearity module 204 generates $\Delta I_D$, which moves the current vector 310 from point 308 on the T2 constant torque curve to point 306 on the T1 constant torque curve, thereby keeping the torque constant and maintaining torque linearity in a field weakening region of the IPM machine. The techniques described herein adjust both $I_D$ and $I_Q$ to decrease flux in the field weakening region, while keeping torque linearity.

Figure 5:
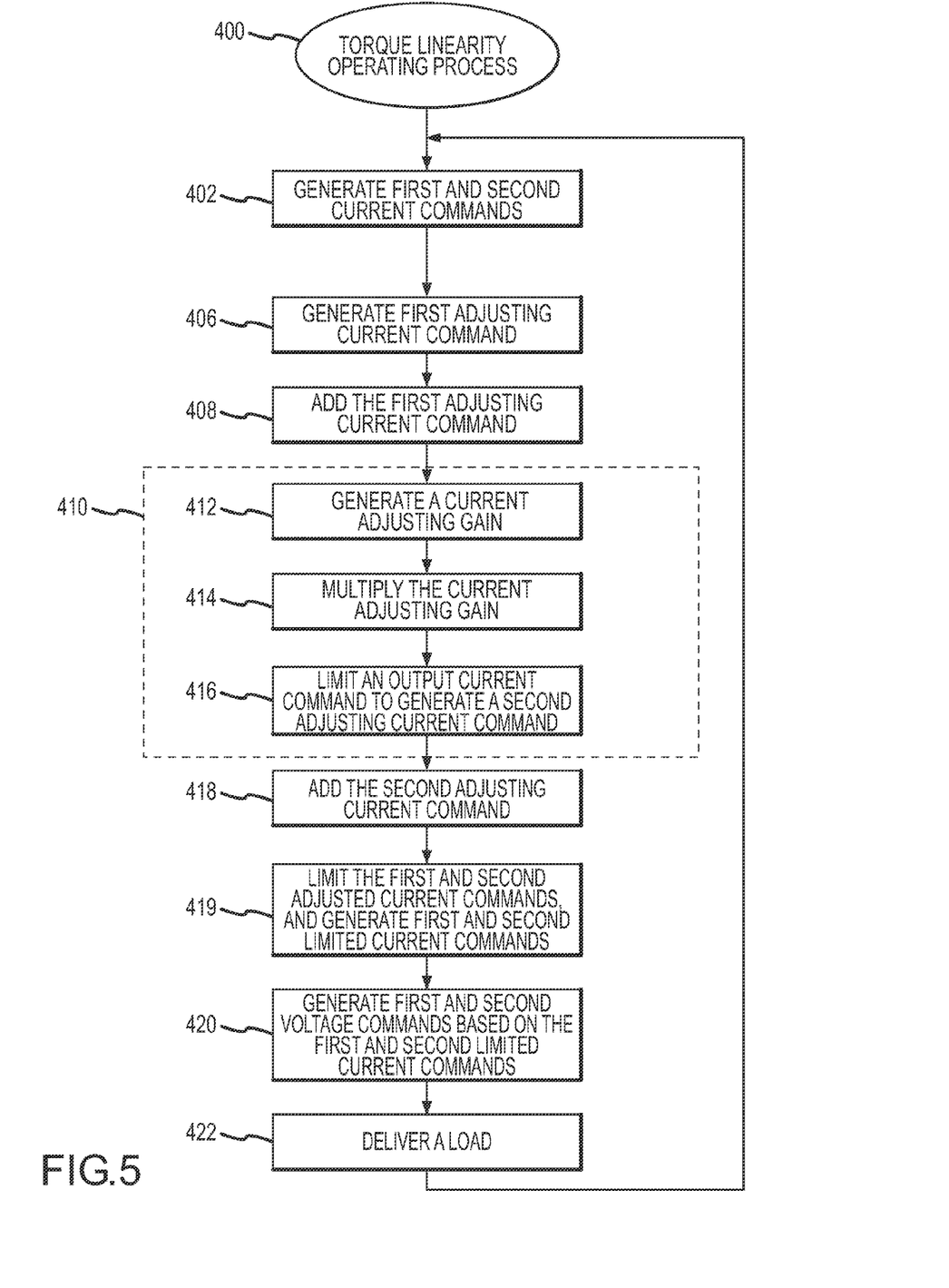
FIG. 5 is a flowchart illustrating a process for operating an electric machine with a torque linearity control block.

FIG. 5 is a flowchart illustrating a torque linearity operating process 400 for an electric, hybrid electric, or fuel cell vehicle. Process 400 may be performed by control system 200 as described above. The various tasks performed in connection with process 400 may be performed by software, hardware, firmware, or any combination thereof. It should be appreciated that process 400 may include any number of additional or alternative tasks, the tasks shown in FIG. 5 need not be performed in the illustrated order, and process 400 may be incorporated into a more comprehensive procedure or process having additional functionality not described in detail herein. For illustrative purposes, the following description of process 400 may refer to elements mentioned above in connection with FIGS. 1-3.

Process 400 adjusts the q-axis and the d-axis components of the stator current commands ($I_D^*$ and $I_Q^*$) of the IPM machine, so torque remains linear during the field weakening region of the IPM machine, which would otherwise fall proportional to the reduction in the flux. In practical embodiments, portions of process 400 may be performed by different elements of control system 200, e.g., the current command 3-D table lookup module 202, the torque linearity module 204, the phase current limit module 211, the synchronous current regulator module with dynamic over modulation 216, the DC to AC transformation module 218, the PWM inverter 220, the AC to DC transformation module 222, the IPM machine 224, and the field weakening control loop module 214.

Torque linearity operating process 400 begins by generating first and second current commands ($I_Q^*$ and $I_D^*$) based on a torque command T*, a rotor angular velocity $\omega_R$, and a DC-link voltage $V_{dc}$ (task 402).

Process 400 also generates an adjusting current command $\Delta I_Q$ based on the $V_D^*$ and $V_Q^*$ voltage commands (task 406), and adds $\Delta I_Q$ to $I_Q^*$ to obtain the $I_Q^{**}$ adjusted current command (task 408). However the torque is reduced as explained in the context of FIG. 3 above. To keep the torque linearity, process 400 generates a $\Delta I_D$ adjusting current command as a function of the $\Delta I_Q$ adjusting current command (task 410). Then, a torque linearity loop applies a current adjusting gain K (task 412), multiplies K by the $\Delta I_Q$ to obtain an output current command $\Delta I_D$ (task 414), and limits the output current command to obtain the $\Delta I_D$ adjusting current command within a desired range (about −30 to about 0 Amps) (task 416). Values of K, and the lower and upper limits of the limiter are explained above.

Process 400 then adds $\Delta I_D$ to $I_D^*$ and the second current command to obtain the $I_Q^{**}$ adjusted current command (task 418). $\Delta I_D$ adjusts the $I_D^*$ current command such that the torque linearity remains constant as shown in FIG. 4 above while the IPM field is weakened. Process 400 then limits the q-axis and the d-axis currents $I_Q^{}$ and $I_D^{}$ to generate the limited q-axis and d-axis current commands $I_Q^{*}$, and $I_D^{*}$ (task 419). In turn, $I_Q^{*}$ and $I_D^{*}$ are used as inputs to module 216 for the generation of the voltage commands ($V_D^*$, and $V_Q^*$). Thereby, the current is suitably regulated to weaken the field in the IPM machine.

Process 400 then generates $V_D^*$ and $V_Q^*$ voltage commands based on $I_D^{*}$, $I_Q^{*}$, $I_D$ and $I_Q$ (task 420).

Process 400 also rotates the IPM machine stator at $\omega_R$ by delivering load-driving currents to the motor (task 422). To do this, the $V_{AS}^*$, $V_{BS}^*$, and $V_{CS}^*$ stationary frame voltage commands are generated based on the $V_D^*$ and $V_Q^*$ synchronous voltage commands, to produce the $I_{AS}$, $I_{BS}$ and $I_{CS}$ stationary frame currents. The load is then delivered via the stationary frame currents to the IPM machine.

With this approach, the torque linearity is maintained in a field weakening region of the IPM machine.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A control system for an electric machine, the control system comprising:
   a synchronous current regulator module that generates first and second voltage commands based on first and second current commands and first and second feedback currents;
   a field weakening module that generates a first adjusting current command based on the first and second voltage commands;
   a first adder to generate a first adjusted current command based on the first adjusting current command and the first current command;
   a torque linearity module that generates a second adjusting current command based on the first adjusting current command; and
   a second adder to generate a second adjusted current command based on the second adjusting current command and the second current command.

2. The system according to claim 1, wherein the torque linearity module further comprises:
   a proportional gain module having a proportional gain, wherein the first adjusting current command is multiplied by the proportional gain to obtain an output current command; and
   a limiter module coupled to the proportional gain module, the limiter module being configured to generate the second adjusting current command by limiting the output current command.

3. The system according to claim 2, wherein the proportional gain is a constant.

4. The system according to claim 2, wherein the proportional gain is a variable that is influenced by torque and q-axis components of stator current.

5. The system according to claim 1, further comprising a table look-up module that receives a torque command, a rotor angular velocity, and a DC-link voltage, and that generates the first and second current commands.

6. The system according to claim 1, wherein the synchronous current regulator module further generates the first and second voltage commands based on the first and second adjusted current commands and first and second feedback currents.

7. The system according to claim 1, further comprising a phase current module that receives a DC-link voltage, and a machine rotor speed, and that limits the first and second adjusted current commands, and generates a first and a second limited current commands.

8. A method for operating an electric machine, the method comprising:
   generating first and second voltage commands based on first and second current commands and first and second feedback currents;
   generating a first adjusting current command based on the first and second voltage commands;
   adding the first adjusting current command and the first current command to obtain a first adjusted current command;
   generating a second adjusting current command based on the first adjusting current command; and
   adding the second adjusting current command and the second current command to obtain a second adjusted current command.

9. The method according to claim 8, wherein generating the second adjusting current command further comprises:
   multiplying the first adjusting current command by a current adjusting gain to obtain an output current command; and
   limiting the output current command to obtain the second adjusting current command.

10. The method according to claim 8, further comprising generating the first and second current commands based on a torque command, a rotor angular velocity, and a DC-link voltage.

11. The method according to claim 8, further comprising generating the first and second voltage commands based on the first and second adjusted current commands and the first and second feedback currents.

12. The method according to claim 8, further comprising receiving a DC-link voltage and a machine rotor speed, limiting the first and second adjusted current commands, and generating a first and a second limited current commands.

13. A torque linearity control architecture for an electric machine, the control module comprising:

a field weakening control loop that generates a first adjusting current command based on d-axis and q-axis voltage commands;

a gain module configured to multiply the first adjusting current command by a gain to obtain an output current command, wherein the gain is calculated based on the relationship $$K = \frac{4}{3*P} \cdot \frac{T^*}{(L_Q - L_D)I_Q^{***2}},$$

wherein K is the gain, P is number of poles of a machine, $L_D$ and $L_Q$ are d-axis and q-axis machine inductances respectively, $T^*$ is a torque command, and $I_Q^{***}$ is a limited q-axis current command; and a limiter module coupled to the gain module, the limiter module being configured to generate a second adjusting current command by limiting the output current command.

14. The control architecture according to claim 13, further comprising an adder coupled to the limiter module and configured to receive the second adjusting current command as one input and a d-axis current command as another input, wherein the adder adds the second adjusting current command to the d-axis current command to generate a d-axis adjusted current command.

15. The control architecture according to the claim 14, further comprising a synchronous current regulator module that generates the d-axis and q-axis voltage commands based on the d-axis adjusted current command, a q-axis adjusted current command, and d-axis and q-axis feedback currents.

16. A torque linearity control architecture for an electric machine, the control module comprising:

a field weakening control loop that generates a first adjusting current command based on d-axis and q-axis voltage commands;

a gain module configured to multiply the first adjusting current command by a gain to obtain an output current command;

a limiter module coupled to the gain module, the limiter module being configured to generate a second adjusting current command by limiting the output current command; and an adder coupled to the limiter module and configured to receive the second adjusting current command as one input and a d-axis current command as another input, wherein the adder adds the second adjusting current command to the d-axis current command to generate a d-axis adjusted current command.

17. The control architecture according to claim 16, wherein the gain is a constant.

18. The control architecture according to claim 16, wherein the gain is calculated based on the relationship $$K = \frac{4}{3*P} \cdot \frac{T^*}{(L_Q - L_D)I_Q^{***2}},$$

wherein K is the gain, P is number of poles of a machine, $L_D$ and $L_Q$ are d-axis and q-axis machine inductances respectively, $T^*$ is a torque command, and $I_Q^{***}$ is a limited q-axis current command.

19. The control architecture according to the claim 16, further comprising a synchronous current regulator module that generates the d-axis and q-axis voltage commands based on the d-axis adjusted current command, a q-axis adjusted current command, and d-axis and q-axis feedback currents.

* * * * *